UNITED STATES PATENT OFFICE.

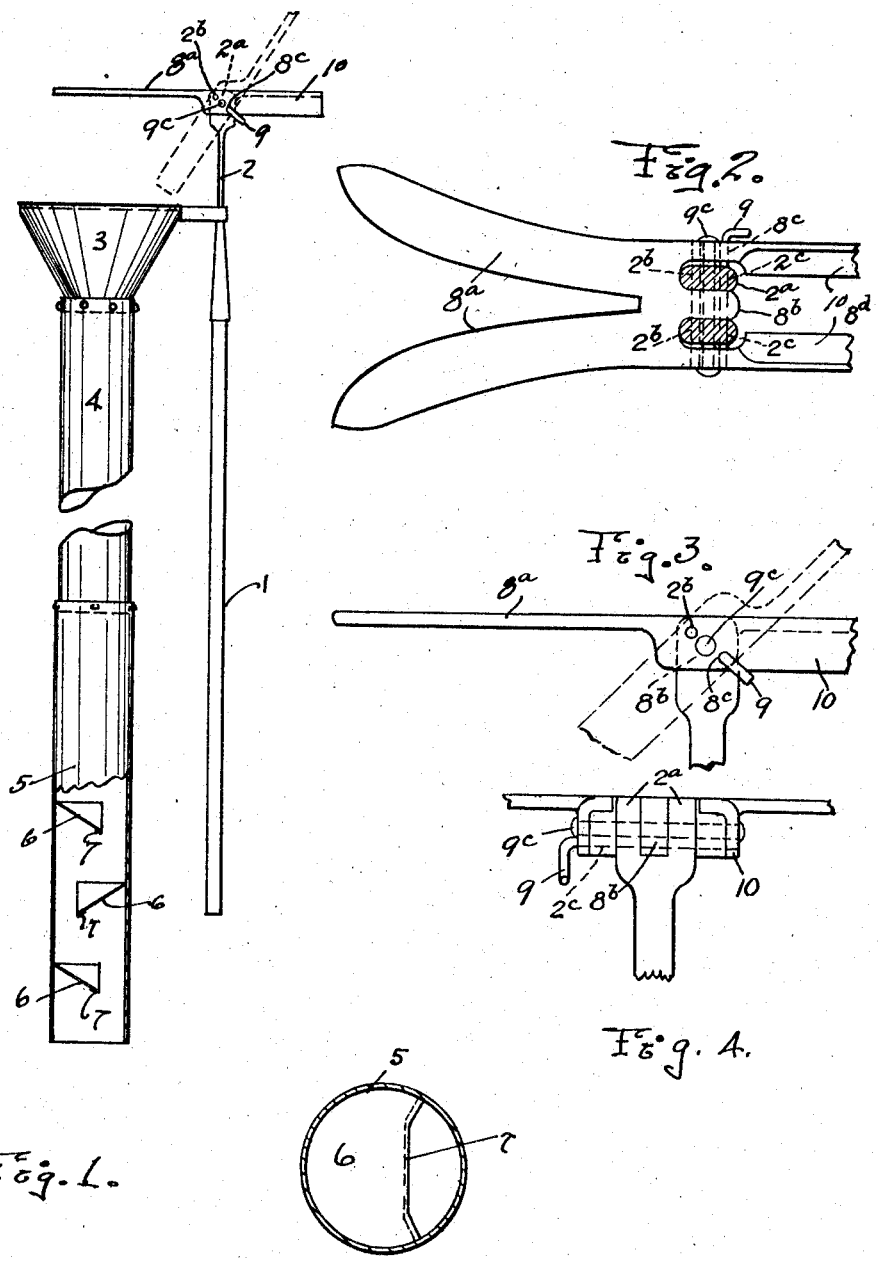

SIETZE HOEBER, OF SEATTLE, WASHINGTON.

FRUIT-PICKER.

1,300,168.

Specification of Letters Patent.

Patented Apr. 8, 1919.

Application filed June 18, 1917. Serial No. 175,258.

*To all whom it may concern:*

Be it known that I, SIETZE HOEBER, citizen of Holland, residing at Seattle, in the county of King and State of Washington, have invented certain new and useful Improvements in Fruit-Pickers, of which the following is a specification.

This invention relates to fruit pickers and has for its principal object to provide an improved and novel fruit picking device which embodies means for removing the individual fruit from the trees and conveying it to the ground. Another object of my device is to provide a flexible fruit conveyer which embodies flexible and resilient baffles within the said conveyer. Still another object of my device is to provide a fruit loosening fork which is mounted in such a way with respect to the other members of the picker as to be attachable for use with either small or large fruit.

Other objects will appear as my invention is more fully explained in the following specification, illustrated in the accompanying drawings and pointed out in the appended claim.

In the drawings Figure 1 is a side elevation of my device with the parts broken away. Fig. 2 is an enlarged fragmentary inverted plan of the fruit removing fork, the bifurcated ends of the support being shown in section. Fig. 3 is a side elevation of same. Fig. 4 is a rear elevation of Fig. 3. Fig. 5 is an enlarged cross sectional elevation of the fruit conveyer in Fig. 2 showing a baffle.

Referring more particularly to the drawings numeral 1 indicates a staff or handle to the upper end of which is secured a fork supporting rod 2, which is bifurcated at its upper end to form ears $2^a$. A reinforced fabric funnel 3 is secured by means of a bracket to the fork support 2 and is provided at its lower end with detachable conveying sections 4 which are preferably formed of cloth tubes secured together by means of snaps, buttons or the like. The lower tube 5 is provided with a series of inclined baffles 6 which partially obstruct the tube 5 and are in standard relationship to each other. The baffles 6 are also made of flexible fabric and are provided with an elastic band 7 along the open end. The function of the elastic band 7 is to partially contract the opening between the edge of the baffle 6 and the tube 5 so that fruit tumbling down the conveyer and striking the baffles will have sufficient weight and force to stretch the elastic and open up sufficient space to permit the fruit to pass successively the various baffles. In this connection the energy which is required to overcome the action of the elastic 7 will be absorbed from the moving fruit and will tend to check gradually the velocity of the fruit without injuring it by bruising and will deliver the fruit to the bottom of the conveyer 5 with little or no velocity. A picking fork $8^a$ having bifurcated prongs 8 is hingedly connected to the top of fork support 2 by a pin $9^c$ and may be retained in the position shown in Fig. 1 or in the dotted position shown in the same figure if desired. The rear end of the fork is slotted as at $8^d$, and at the inner end of the slot is a central lug $8^b$ which with the side of said fork form spaces for the reception of the ears $2^a$. Extending through the ears $2^a$ are two openings $2^b$ and $2^c$ disposed on opposite sides of the pin $9^c$, and either of said openings $2^b$—$2^c$ may be brought into alinement with an opening $8^c$, in the fork. A pin 9, extends through the opening $8^c$, and one of the openings $2^b$ or $2^c$ in the ears to hold the fork in adjusted position.

The rear of fork adjacent the slot $8^d$ is provided with side flanges to form chute 10, which when said fork is in the dotted line position shown in Figs. 1 and 3, acts to direct fruit to the funnel.

To lock the fork in position to pick large fruit such as apples, peaches or pears, it is disposed as shown in full lines in Fig. 1, the pin $9^c$, being inserted through the openings $8^c$ in the fork and the openings $2^c$, in the ears $2^a$. Now if it be desired to pick grapes or the like fruit, the pin $9^c$ is withdrawn and the fork is tilted on its pivot with the chute and swung forwardly as shown in dotted lines in Figs. 1 and 3, and then the pin $9^c$ is inserted through openings $8^c$ and the openings $2^b$ in the ears which locks the fork to the rod 2.

From the foregoing description it will be seen that when the fork is horizontally disposed it can be readily moved to engage the stem of the fruit, and when the latter falls it drops into the funnel. Also when picking grapes, and the fork is tilted as described, the fruit will, when pulled from the vines slide down the chute to the funnel without bruising.

While I have shown a particular form of embodiment of my invention, I am aware that many minor changes therein will readily suggest themselves to others skilled in the art without departing from the spirit and scope of the invention, and I therefore desire to avoid being limited to the exact form shown and described.

Having described my invention, what I claim as new and desire to protect by Letters Patent, is:—

In a fruit picking device the combination of a fork supporting staff, a fork hingedly secured to the upper end of said staff, a slotted chute integral with the said fork and extending beyond the hinge point of said fork and oppositely disposed to the fork and means for retaining the fork and chute at selective angles with respect to the said fork supporting staff.

In testimony whereof I affix my signature.

SIETZE HOEBER.

Copies of this patent may be obtained for five cents each, by addressing the "Commissioner of Patents, Washington, D. C."